United States Patent

Kitaoka et al.

[15] 3,659,041

[45] Apr. 25, 1972

[54] FM-FM AUDIO MULTIPLEX TELEVISION BROADCASTING SYSTEM WITH REDUCTION OF UNDESIRED PHASE MODULATION COMPONENT

[72] Inventors: Kouichi Kitaoka; Taku Ichihara, both of Yokohama, Japan

[73] Assignee: Tokyo Shibaura Electric Co., Ltd., Kawasaki-shi, Japan

[22] Filed: June 17, 1970

[21] Appl. No.: 46,903

[30] Foreign Application Priority Data

June 20, 1969 Japan....................................44/48553

[52] U.S. Cl.........................178/5.8 R, 178/7.1, 178/DIG. 23, 179/15 AN, 179/15 BT, 325/145, 332/18, 332/21, 332/37, 332/41

[51] Int. Cl...........................................H04n 5/40, H03c 1/04

[58] Field of Search...........178/5.6, 5.8 R, DIG. 12, DIG. 23, 178/7.1; 179/15 BT, 15 AN; 332/18, 21, 37, 41; 325/145, 147, 65

[56] References Cited

UNITED STATES PATENTS

| | | | |
|---|---|---|---|
| 2,075,071 | 3/1937 | Usselman | 179/15 ST |
| 3,378,632 | 4/1968 | Lomer | 332/37 X |
| 3,046,329 | 7/1962 | Reesov | 178/5.6 |
| 3,528,037 | 9/1970 | Yamazaki | 332/37 |

*Primary Examiner*—Robert L. Richardson
*Attorney*—Flynn & Frishauf

[57] ABSTRACT

An FM—FM audio multiplex television broadcasting system, wherein the video carrier is phase controlled by a phase controller provided prior to the video modulation stage and including a varactor diode, whose electrostatic capacitance varies with the video signal, in such a manner that the component of phase modulation accompanying the video carrier amplitude modulation with the video signal is canceled.

7 Claims, 3 Drawing Figures

PATENTED APR 25 1972 3,659,041

FM-FM AUDIO MULTIPLEX TELEVISION BROADCASTING SYSTEM WITH REDUCTION OF UNDESIRED PHASE MODULATION COMPONENT

BACKGROUND OF THE INVENTION

This invention relates to FM—FM radio multiplex television systems and, more particularly, to a carrier compensating system for compensating the video carrier for the phase modulation accompanying the video carrier amplitude modulation with the video signal.

The FM—FM audio multiplex television broadcasting system herein refers to a television system utilizing a well-known FM—FM system, which is employed in transmitting multiplex message, for instance bilingual signals or stereophonic signals, and in which one of the two sound signals to be superimposed is used for frequency modulation on a subcarrier at double the frequency of the horizontal synchronizing signal and the frequency-modulated subcarrier is combined with the other audio signal for frequency modulation of the main carrier.

In the usual television broadcasting system, the phase modulation accompanying the amplitude modulation of the video carrier gives rise to buzz which degrades the sound quality if the television receiving set adopts the intercarrier system. The vertical and horizontal components mainly affect the buzz component.

In the FM—FM audio multiplex television broadcasting system using an audio subcarrier, the sound signal seriously suffers from undesired disturbing signals particularly due to the horizontal synchronizing component because of the fact that in such system the audio signal modulation is used for frequency modulation on a subcarrier, whose frequency has a predetermined bearing upon the frequency of the horizontal synchronizing signal. The introduction of a great buzz component into the sound in such system greatly degrades the sound quality.

SUMMARY OF THE INVENTION

An object of the invention is to provide an FM—FM audio multiplex television broadcasting system, in which the video carrier is previously phase modulated prior to the picture signal modulation by utilizing the variation of the electrostatic capacitance of a varactor diode with the video signal such that the component of the phase modulation accompanying the video carrier amplitude modulation is canceled.

DETAILED DESCRIPTION OF THE PREFERRED EMBODIMENTS

Figure 1:
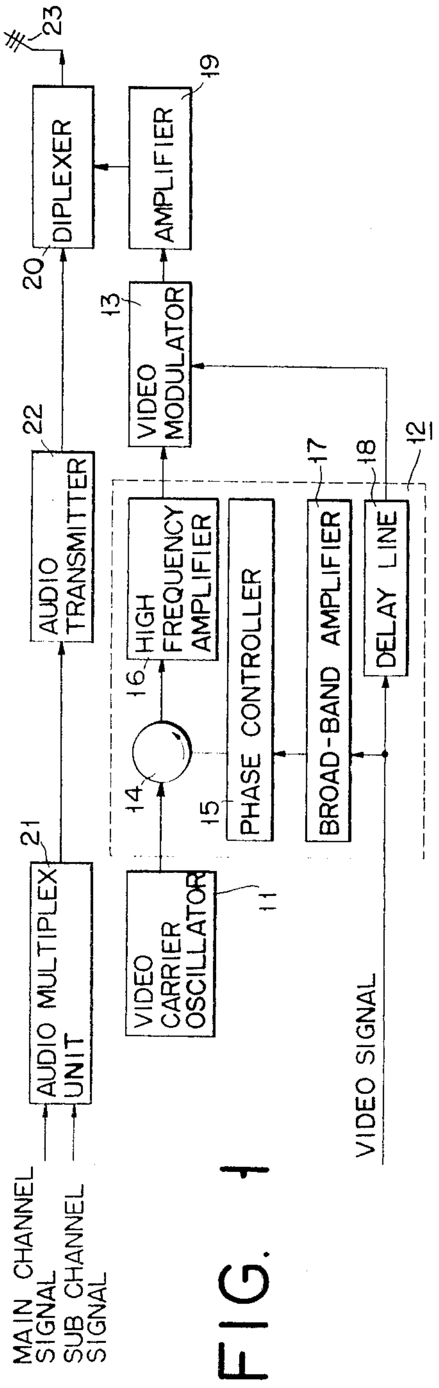
FIG. 1 is a block diagram of an embodiment of the FM—FM audio multiplex television broadcasting system according to the invention.

Referring now to FIG. 1, which illustrates an FM—FM audio multiplex television broadcasting system embodying the invention, a video carrier oscillator 11 feeds a video carrier through a phase control circuit generally designated at 12 to a video modulator 13. The video carrier entering the phase control 12 passes through a circulator 14 to reach a phase controller 15, where it is reflected back to the circulator 14, and then it is led through high-frequency amplifier 16 to the video modulator 13. The phase controller 15 is shown in detail in FIG. 2. It is comprised of a series circuit of a coil 31 to receive the output from the circulator 14 and a varactor diode 32 having its anode connected to the coil 31.

Figure 2:
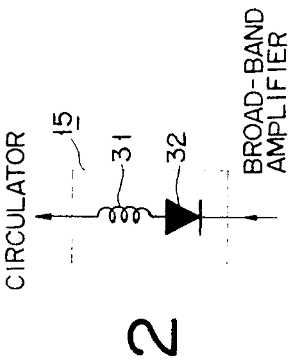
FIG. 2 is a circuit diagram of the phase controller in the embodiment of FIG. 1.

The video signal coming from picture input unit (not shown) and entering the phase control circuit 12 encounters a branching point, as shown in FIG. 1, from which a branch leads through a broad band amplifier 17 to the cathode of the varactor diode 32 in the phase controller proper 15, as shown in FIG. 2. The electrostatic capacitance of the varactor diode 32 varies in accordance with the voltage of the picture signal impressed thereon so as to vary the reactance for the series circuit 15 consisting of the coil 31 and the varactor diode 32, so that the video carrier wave incident on the phase controller 15 undergoes a phase shift in a direction to counter or cancel the component of phase modulation involved when the reflected video carrier is later amplitude-modulated with the video signal to be described hereinafter.

Another branch leads from the aforementioned branching point through a delay line 18 to the video modulator 13. The phase-compensated video carrier fed to the video modulator 13 is amplitude-modulated therein with the video signal entering there through the delay line 18 of the phase control circuit 12. The video signal entering the video modulator 13 is delayed a predetermined time by the delay line 18 such that the phase modulation introduced into the video carrier by the phase controller 15 is timed to offset the phase modulation accompanying the amplitude modulation of the video carrier with the video signal. The phase modulation component produced at the time of the amplitude modulation by the video modulator 13 is canceled, and the output from the video modulator is free from the phase modulation component. The amplitude-modulated output signal from the video modulator 13 is amplified by an amplifier 19 and then fed to a diplexer 20.

The video multiplex signal containing the main channel and subchannel signal components, which is synthesized by a video multiplex unit 21, is amplified by an audio transmitter 22 and then fed to the diplexer 20. The diplexer 20 receiving the video AM signal and the audio FM signal feeds its output from its output terminal to a transmitting antenna 23.

As is described, according to the foregoing embodiment shown in FIGS. 1 and 2 a video AM signal with a reduced phase modulation component stemming from the amplitude modulation of the video carrier may be made available by phase controlling the video carrier through the variable electrostatic capacitance of the varactor diode 32 in accordance with the video signal prior to the amplitude modulation by the video modulator 13, so that the undesired disturbing signal such as buzz due to the phase modulation component contained in the video AM signal is greatly reduced when reproducing an audio multiplex signal with the intercarrier type television receiving set. Thus, excellent quality of the reproduced multiplex sound may be ensured.

Figure 3:
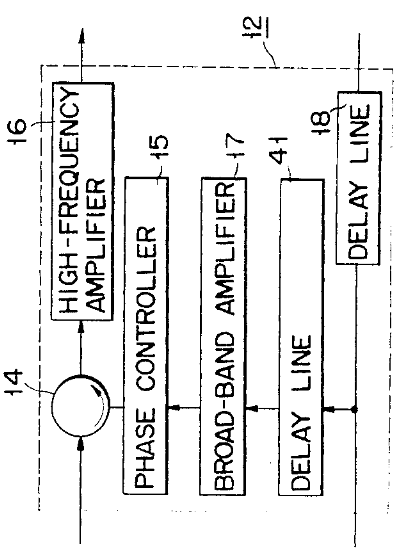
FIG. 3 is a block diagram of another embodiment of the FM—FM audio multiplex television broadcasting system according to the invention.

FIG. 3 shows another embodiment of the invention. In this embodiment, another delay line 41 is inserted between the aforementioned branching point and the broad-band amplifier 17 in the previous embodiment. Similar to the previous embodiment, the video signal entering the video modulator 13 is delayed a predetermined period of time, which is in this embodiment determined by the delay lines 18 and 41, such that the phase modulation introduced into the video carrier is timed to off-set the phase modulation accompanying the amplitude modulation in the video modulator 13.

As has been described in the foregoing, according to the invention it is possible to provide an FM—FM audio multiplex television system, which permits extracting a high-quality video multiplex signal with reduced disturbing signal component with the intercarrier type television receiving set.

What we claimed is:

1. An FM—FM audio multiplex television broadcasting system comprising:

means to produce an FM—FM audio multiplex signal, means to modulate a video signal to produce an amplitude-modulated video signal, said modulating means including:

an oscillator to produce a video carrier;

a phase control circuit, including a passive element, responsive to the video signal to control the phase of said video carrier, prior to the amplitude-modulation, as a function of the video signal such that the component of phase modulation accompanying the amplitude modulation is canceled; and a video modulator to produce said amplitude-modulated video signal by amplitude-modulating with said video signal the phase-modulated video carrier from said phase control circuit; and means to produce a broadcasting signal containing said audio multiplex signal and said amplitude-modulated video signal.

2. The FM—FM audio multiplex television broadcasting system according to claim 1 wherein said phase control circuit comprises:

a circulator to receive and circulate said video carrier from said oscillator;

a phase controller comprising said passive element to receive the video signal and the video carrier through said circulator and to modulate the phase of said video carrier as a function of said video signal such that the phase modulation occurring in said video modulator is canceled; and a first delay line to delay in time said video signal with respect to said video carrier before said video signal enters said video modulator.

3. The FM—FM audio multiplex television broadcasting system according to claim 1, wherein said phase control circuit comprises:

a circulator to receive and circulate said video carrier from said oscillator;

a broad-band amplifier to receive the video signal;

a phase controller comprising said passive element to receive the amplified video signal from said broad-band amplifier and the video carrier through said circulator and modulate the phase of said carrier as a function of said amplified video signal such that the phase modulation occurring in in said video modulator is canceled;

a high-frequency amplifier to receive said phase-modulated video carrier through said circulator and to supply an amplified output to said video modulator; and a first delay line to delay in time said video signal with respect to said video carrier before said video signal enters said video modulator.

4. The FM—FM audio multiplex television broadcasting system according to claim 3, wherein said phase controller comprises a coil connected to said circulator, and said passive element comprises a varactor diode connected from said coil to said broad-band amplifier, the electrostatic capacitance of said varactor diode being varied as a function of the amplified video signal to control the phase of the video carrier.

5. The FM—FM audio multiplex television broadcasting system according to claim 3, wherein said phase controller further includes a second delay line to delay the video signal before said video signal enters said phase controller.

6. The FM—FM audio multiplex television broadcasting system according to claim 1 wherein said passive element is responsive to said video signal to cause amplitude modulation of said video carrier as a function of said video signal.

7. The FM—FM audio multiplex television broadcasting system according to claim 6 wherein an electrical characteristic of said passive element is varied responsive to said video signal.

* * * * *